Aug. 8, 1933.　　　　S. W. SPARROW　　　1,921,044
BEARING
Filed Feb. 8, 1932
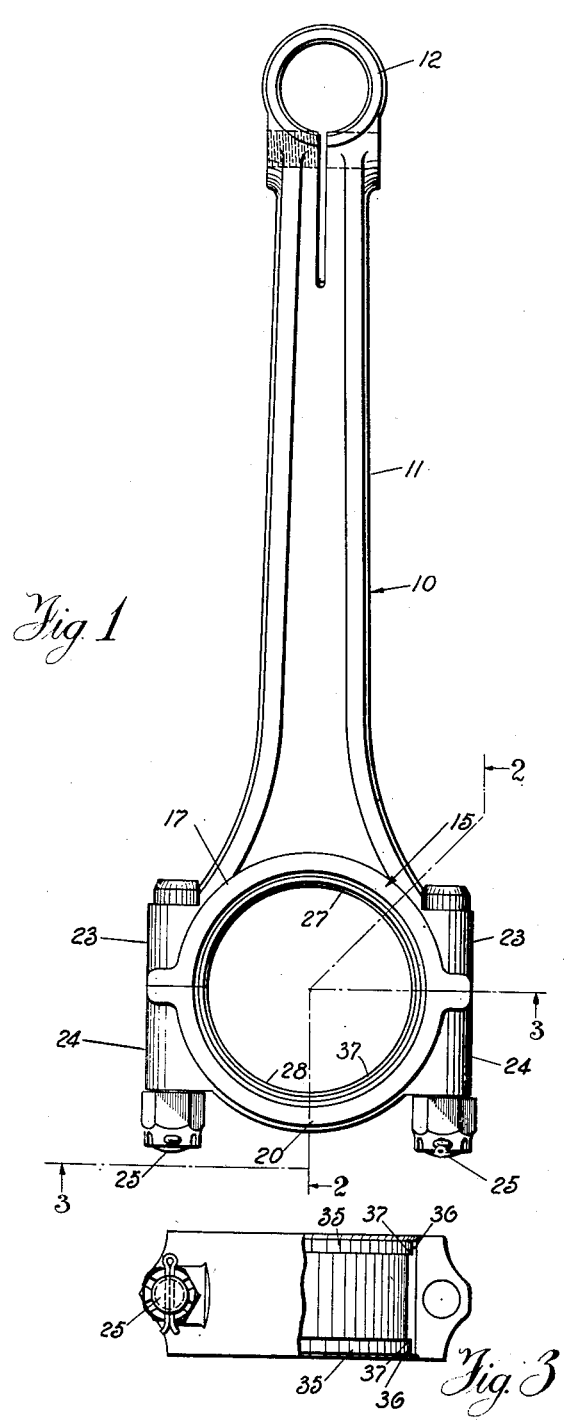
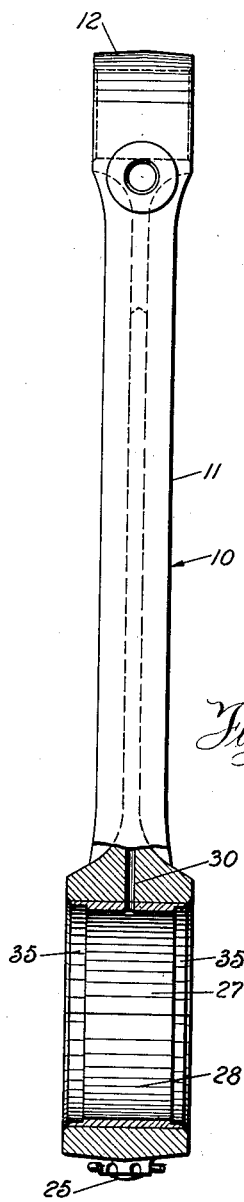
INVENTOR.
Stanwood W. Sparrow
BY P. W. Pomeroy
ATTORNEYS.

Patented Aug. 8, 1933

1,921,044

UNITED STATES PATENT OFFICE 1,921,044

BEARING

Stanwood W. Sparrow, South Bend, Ind., assignor to The Studebaker Corporation, South Bend, Ind., a Corporation of New Jersey Application February 8, 1932. Serial No. 591,581

6 Claims. (Cl. 308—237)

This invention relates to babbitted journal bearings of the type generally used as connecting rod bearings and main bearings in internal combustion engines, and has for its principal object the provision of means for materially improving the wearing qualities of such a bearing.

A further object is the provision of means of the character described which may be easily and economically applied to the bearings, and which will in no way interfere with the normal operation of the bearing.

Other objects and advantages will appear as the description proceeds.

One mechanical embodiment of the idea of this invention is illustrated in the accompanying drawing. The drawing, however, is to be taken as illustrative only and not as limiting the invention, the scope of which is to be measured entirely by the scope of the subjoined claims.

In the drawing:

Figure 1 is an elevational view of a connecting rod for an internal combustion engine, the connecting rod including a bearing constructed according to the idea of this invention.

Figure 2 is another elevational view of the connecting rod illustrated in Figure 1 showing a sectional view of the bearing taken on the line 2—2 of Figure 1 looking in the direction of the arrows.

Figure 3 is a view on the line 3—3 of Figure 1 looking in the direction of the arrows.

Referring to the drawing in detail, the numeral 10 generally indicates a connecting rod for an internal combustion engine, said connecting rod having a stem portion 11, a wrist pin bearing 12, and a crank pin bearing generally indicated at 15. The crank pin bearing comprises an upper semi-circular portion 17 formed in the lower end of the connecting rod and a lower semi-circular cap portion 20, both the rod and the cap being provided with apertured lateral ears 23 and 24 respectively to receive the bearing bolts 25. The upper and the lower semi-circular portions of this bearing are provided with babbitt linings 27 and 28 respectively. An oil channel 30 leads through the upper babbitt lining and through the stem of the connecting rod to the wrist pin bearing 12.

It has been found in practice that with the usual construction of babbitt lining for such bearings, after a limited amount of use the babbitt lining tends to crack, and as these cracks extend and multiply the lining becomes in effect a mosiac of many small pieces of bearing material held against the bearing backing by the pressure of the bearing bolts upon the bearing. As the cracks increase with continued use, they gradually extend to the outer edges of the babbitt lining. There is then a strong tendency for the small pieces of babbitt material to escape from the bearing and leave cavities of varying dimensions in the surface of the bearing. This causes conditions of unequal wear upon the remaining part of the babbitt material and soon renders the bearing unfit for further service.

The specific object of this invention is to provide an effective means for preventing the cracks in the bearing material from extending to the outer edges of the bearing and to prevent the small pieces of the bearing between the cracks from being lost from the bearing during operation. This has been accomplished by providing in each outer edge of the bearing material a small angular groove or undercut 35.

In the preferred form of the invention, as illustrated in Figures 2 and 3, these grooves or undercuts each comprise a flat circumferential portion 36 extending inwardly from the outer edge of the bearing material and a radial shoulder portion 37 extending from the inner surface of the bearing material to the inner edge of the circumferential portion 36.

If the dimensions of the portions 36 and 37 be chosen with proper care, it will be found that although cracks will still occur in the body of the bearing material during operation, they will not extend through the undercut portions 35 to the outer edge of the bearing and that the ring defined by the circumferential portion 36 will remain intact thereby retaining all the small portions of the bearing material within the bearing.

Although the bearings may be cracked and may become in effect a mosaic of small irregular pieces as heretofore, yet as these pieces are held closely together by the intact ring 36 upon either side thereof, the cracks will not materially effect the wearing qualities of the bearing.

Having now described my invention and the principal objects and advantages thereof so that others skilled in the art may clearly understand the same, what I desire to secure by Letters Patent is as follows:

What I claim:

1. A babbitt lined bearing having flat, annular recesses in each edge thereof extending to the edge of the bearing and terminated by an annular shoulder at the bearing surface, that provides in the lining an integral, thin, continuous band of Babbitt metal between the bearing surface and the edge of the bearing.

2. A bearing having a soft metal lining, said lining having an annular band portion and an integral band portion at an edge thereof, said second band portion having its inner face spaced radially outwardly from and substantially parallel with the inner face of said first band portion.

3. A bearing having a soft metal lining, said lining having a central band portion, and an integral band portion at each edge thereof, said last band portions having their inner faces spaced radially outwardly from and substantially parallel with the inner face of said central band portion.

4. A bearing having a soft metal lining, said lining having a central band portion and an integral band portion at each edge thereof thinner than said central portion, said last band portion extending from the edges of said central portion to the adjacent edges of said bearing and having their inner faces spaced radially outwardly from and substantially parallel with the inner face of said central band portion.

5. A connecting rod bearing comprising, complementary semi-cylindrical bearing portions in the connecting rod and in a bearing cap for said rod, and soft metal linings in said semi-cylindrical bearing portions, said linings being cut away along the edges thereof to provide annular portions, the inner surfaces of which are parallel to and below the bearing surface of said lining, said annular portions extending to the corresponding edges of the bearing and being materially wider than the thickness of said lining.

6. A connecting rod bearing comprising, complementary semi-cylindrical bearing portions in the connecting rod and in a bearing cap for said rod, said linings being cut away along the edges thereof to provide annular portions integrally united therewith the inner surfaces of which are parallel to and below the bearing surface of said lining, said annular portions extending to the corresponding edges of said bearing and being materially wider than the thickness of said lining.

STANWOOD W. SPARROW.